United States Patent [19]

Anderson et al.

[11] 4,146,164
[45] Mar. 27, 1979

[54] PRODUCTION OF ALUMINUM BRAZING SHEET

[75] Inventors: William A. Anderson, Pittsburgh, Pa.; George D. Wilkinson, Maryville, Tenn.; William D. Vernam, New Kensington, Pa.

[73] Assignee: Aluminum Company of America, Pittsburgh, Pa.

[21] Appl. No.: 849,997

[22] Filed: Nov. 9, 1977

[51] Int. Cl.² .............................................. B23K 19/00
[52] U.S. Cl. .................................... 228/158; 228/190; 228/235; 228/238; 228/263; 428/654
[58] Field of Search .............. 228/158, 190, 235, 238, 228/243, 263; 29/527.7; 72/366, 700; 428/654

[56] References Cited

U.S. PATENT DOCUMENTS

| 2,800,709 | 7/1957 | Gaul | 228/190 |
|---|---|---|---|
| 3,321,828 | 5/1967 | Miller | 228/220 |
| 3,853,547 | 12/1974 | Singleton | 75/147 |
| 3,863,453 | 6/1976 | Singleton | 428/654 |
| 3,917,151 | 11/1975 | Robinson et al. | 228/220 |
| 3,963,454 | 6/1976 | Singleton | 428/654 |

OTHER PUBLICATIONS

"Aluminum 6951" Alloy Digest, Feb. 1970, pp. AL-195.

Primary Examiner—C. W. Lanham
Assistant Examiner—K. J. Ramsey
Attorney, Agent, or Firm—Andrew Alexander

[57] ABSTRACT

Aluminum brazing sheet is produced by providing a composite assembly comprising an ingot of aluminum alloy and a layer of an aluminum brazing alloy on at least one side of the ingot. Provided on both sides of the composite assembly is a second layer of aluminum alloy substantially free of eutectic or elemental silicon. The composite assembly and the second layer are hot bonded and formed into brazing sheet by steps including hot rolling in a reversing mill followed by hot rolling in a continuous mill.

8 Claims, 1 Drawing Figure

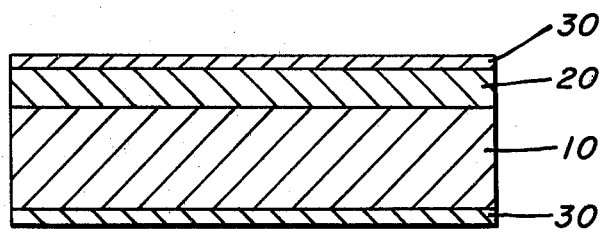

PRODUCTION OF ALUMINUM BRAZING SHEET

INTRODUCTION

This invention relates to brazing sheet and more particularly to the production of aluminum-silicon and aluminum-silicon-magnesium brazing sheet.

In the prior art, it is known that brazing may be used to join pieces of aluminum together by employing a low-melting aluminum-silicon alloy and a suitable flux in a brazing furnace operating at a temperature between the melting temperature of the aluminum-silicon alloy and that of a higher melting alloy being joined. It is also known that aluminum structural members, i.e. the higher melting alloy being joined, and the brazing alloy may be bonded together by hot rolling to form a composite sheet having the brazing alloy on one or both surfaces thereof and the higher melting alloy constituting the core of the sheet. The resulting composite is employed in making brazed assemblies.

In the prior art it is also known that fluxless brazing may be used to join pieces of aluminum together by exposing the surfaces to be joined to magnesium vapor during the brazing operation. This method of brazing is taught by Miller in U.S. Pat. No. 3,321,828. The magnesium may be provided at the juncture to be joined in the form of an aluminum brazing sheet containing magnesium and silicon. Magnesium has a comparatively high vapor pressure. Thus, Robinson U.S. Pat. No. 3,891,400 teaches that to prevent premature vaporization during the brazing operation, the magnesium containing member, e.g. aluminum brazing alloy consisting essentially of 5.0 to 15.0 wt.% Si, 0.5 to 5.0 wt.% Mg, max. 0.8 wt.% Fe, max. 0.25 wt.% Cu, max. 0.2 wt.% Zn, max. 0.2 wt.% Mn, should be clad with a magnesium-free aluminum alloy.

However, the production of brazing sheet employing a silicon or silicon-magnesium containing aluminum alloy on an aluminum core is not without problems. For example, when rolling an ingot clad on one side with brazing alloy, i.e. silicon or silicon-magnesium containing sheet, often it will be found that the slab being formed tends to bow or curl making further rolling of it difficult without damaging the rolling equipment. Furthermore, in reducing such slab to brazing sheet thickness in a continuous mill, other problems such as cobbling can result, i.e. accumulations of sheet between rolling stands due to slippage and failure of the rolls to grip the sheet as it is fed into succeeding rolling stands. Such rolling problems can result in as much as 50 percent of the metal being scrapped. Thus, it will be appreciated that, in addition to the scrap loss, considerable expense can be incurred in downtime in correcting the bowing or cobbling problems.

The present invention, by utilizing a process which substantially eliminates the problems of bowing or curling and cobbling during rolling operations, permits the production of brazing sheet in a highly economical manner.

SUMMARY OF THE INVENTION

An object of this invention is to provide a composite assembly for forming into one-side clad brazing sheet.

Another object of this invention is to provide brazing sheet having a core of an aluminum alloy, a brazing alloy clad on one side thereof and a layer of aluminum substantially free of elemental silicon on the outside of the brazing sheet and on the outside of the core material.

Yet another object of the invention is to provide a method for the production of one-side clad brazing sheet.

And yet another object of the invention is to provide a method for the production of one-side clad brazing sheet which will eliminate curling and cobbling during rolling operations.

These and other objects will become apparent from the drawings, specification and claims attached hereto.

Aluminum brazing sheet is produced by providing a composite assembly comprising an ingot of an aluminum alloy and a layer of an aluminum brazing alloy on one side of the ingot, providing on both sides of the composite assembly a second layer of aluminum alloy substantially free of eutectic or elemental silicon, hot bonding the ingot and layers by rolling at a temperature in the range of 850° to 950° F. in a reversing mill, and continuously rolling to form brazing sheet.

BRIEF DESCRIPTION OF THE DRAWING

FIG. 1 depicts a cross section of brazing sheet in accordance with the present invention.

DETAILED DESCRIPTION OF PREFERRED EMBODIMENTS

By reference to the FIGURE, it will be seen that in one embodiment of the present invention the brazing sheet comprises an aluminum core 10, an aluminum brazing layer 20 clad on one side of the core and an aluminum layer 30 clad on core 10 and brazing layer 20. With respect to core 10, the aluminum alloy used therein must be selected to provide the requisite structural properties. Thus, the alloy used in core 10 must contain by weight percent 0 to 1.5 Mn, up to 0.7 wt.% Mg and preferably less than 0.5 wt.% Mg, 0.3 wt.% Si max. and preferably 0.2 wt.% Si max., 0.7 wt.% Fe max., 0.25 wt.% Cu max., 5.0 wt.% Zn max., 0.25 wt.% Cr max., the remainder aluminum and incidental impurities. Preferably such aluminum alloys include 3003, 3105, 3005 and the like, which provide both higher strengths than commercial-purity aluminum and the structural rigidity needed in brazed assemblies.

The brazing layer 20 can contain by weight percent 5.0 to 13.0 wt.% Si, 0 to 2.5 wt.% Mg, 0.8 wt.% Fe max., 0.3 wt.% Cu max., 0.3 wt.% Zn max., 0.3 wt.% Mn max., the remainder aluminum and incidental impurities. It will be understood that a similar composition range would be used for flux brazing except the composition would normally be substantially magnesium free.

In the instance where flux is used to aid the joining operation, normally an alkali metal halide flux is employed to overcome the oxide coating on the parent metal and allow the filler metal to wet and flow over the parent metal surfaces. This is considered necessary to obtain the capillary flow and uninterrupted fillet formation desired. In furnace brazing, the flux is applied as an aqueous flux suspension to the assembled parts which are dried prior to heating to brazing temperature. Typical flux suspensions contain 50% or more of the flux, and they deposit substantial and easily visible amounts of flux on the parts. Fluxes typically used in this operation are described in U.S. Pat. No. 3,431,629 incorporated herein by reference. It will be understood that the presence of magnesium in the brazing layer makes the use of fluxes unnecessary when brazing is performed in a vacuum environment.

A layer 30 of substantially silicon-free aluminum alloy is provided so as to clad core 10 and the brazing layer 20 as depicted in the figure. By substantially silicon-free aluminum alloy is meant an aluminum alloy substantially free from eutectic or elemental silicon and generally having less than 0.4 wt.% Si and preferably having not more than 0.2 wt.% Si present. It is highly desirable to keep silicon as low as possible. Thus, less than 0.1 wt.% Si can be desirable. The alloy should also contain not more than 0.7 wt.% Fe and preferably not more than 0.5 wt.% Fe. The amount of copper present in the alloy should not be more than 0.2 wt.% and preferably not more than 0.1 wt.%. Also, the amount of Mn present should not be more than 1.5 wt.% with a preferred amount being not more than 0.3 wt.%. Magnesium can be present in the alloy up to 1.0 wt.% with a preferred maximum being 0.3 wt.%. In addition, manganese plus magnesium should not exceed 1.5 wt.%. Zinc may be present up to 3.0 wt.% with a preferred amount being less than 2.5 wt.%. The remainder of the alloy should consist essentially of aluminum and incidental impurities. If desired, for improved brazed components at least one of the group consisting of bismuth, lead and tin in the range of 0 to 0.2 wt.% may be added to rolling layer 30.

With respect to the core alloy, it is important that the limits with respect to silicon and magnesium are closely adhered to. It is known that silicon penetration of the core alloy can cause severe melting along grain boundaries during the brazing operation. That is, melting can occur in the core material as a result of silicon penetrating or diffusing into the core from the brazing layer. Magnesium in the core alloy accentuates the problem and should not exceed the limits indicated. Long heating times during the brazing operation also tend to promote penetration of the core alloy by silicon. In addition, grain size is important in that small grains also tend to promote the penetration of the core by silicon. It should be noted that the silicon penetration is highly undesirable since it can result in sagging of the structural member and can also result in intergranular corrosion, thereby diminishing the useful life of the member. Thus, to provide optimum grain size, that is, grain size most resistant to silicon penetration, iron is preferably maintained in the range of 0.2 to 0.5 wt.%.

In fabrication of brazing sheet in accordance with the principles of the present invention, an ingot of aluminum alloy for use as the core 10 is first normally scalped to remove surface irregularities therefrom. After scalping, the ingot normally has a thickness in the range of 10 to 20 inches. An ingot of brazing alloy which has been previously wrought or formed into a slab having a thickness in the range of 1 to 3 inches is secured as by straps or the like to the ingot used as the core. For rolling purposes, a layer of the substantially silicon-free alloy is also secured to the outside surfaces of the composite assembly to provide a composite after rolling substantially as shown in the figure. The layer can range from 0.25 to 1.0 inch thick on the ingot and should constitute 0.5 to 10.0% of the final composite assembly. It should be understood that the stock used for the rolling layer may be bonded to the brazing alloy as by hot rolling prior to being secured to the ingot used for the core material. Other combinations may be used as long as the above thicknesses are maintained. For purposes of bonding the composite, it is first heated to a temperature in the range of 850° to 1000° F. and then hot rolled in a reversing mill to a thickness in the range of about 2.0 to 4.0 inches. During such rolling, because of the silicon-free layer, the top and bottom rolls on the reversing mill encounter identical alloys which prevent bowing or curling of the assembly as it is rolled. The silicon-free layer is important for additional reasons as discussed hereinafter.

While the inventors do not necessarily wish to be held to any theory of invention, it is believed that one cause of the bowing or curling of an assembly with different alloys on the top and bottom surfaces results from different coefficients of friction between the alloys and the rolls. This causes one alloy to elongate faster than the other. However, as noted, in the present invention, when a layer of substantially silicon-free alloy is provided on the core and on the brazing layer both rolls encounter the same alloy, substantially eliminating the bowing problem.

To further reduce the composite to brazing sheet thickness, e.g. 0.012 to 0.125 inch, it is passed through a continuous, multi-stand rolling mill. It is in this rolling operation that a substantially silicon-free layer has particular significance. In the continuous mill, the presence of eutectic silicon in the outer or cladding layer can result in serious cobbling problems which, as explained earlier, is an accumulation of brazing sheet between stands in the continuous rolling mill. Obviously, these accumulations twist, score and distort the sheet resulting in downtime of the mill for its removal. The problem is further compounded by the fact that prior rolling operations are severely curtailed and very often partially rolled ingot and slab must be returned for heating to suitable rolling temperatures which, obviously is very inefficient and greatly increases the heating energy requirements for rolling.

The cobbling results mostly from the presence of eutectic or elemental silicon in the cladding or outer layer. That is, elemental silicon in the cladding results in a surface which provides low friction and poor gripping or entry characteristics with respect to the rolls of the continuous rolling mill. To achieve entry to the mill, it may be necessary to schedule smaller gauge reductions which are inefficient and may require additional rolling passes to reach the desired sheet thickness, an expensive and energy-consuming operation. Thus, in a multi-stand mill, i.e. a continuous rolling mill, a rolling stand may have satisfactory friction and entry characteristics with respect to the sheet and gauge of the brazing alloy and the next stand may have unsatisfactory friction and gripping characteristics for the reduction required for efficient operation, resulting in an accumulation of sheet between the stands or the cobbling problem. In the case of conventional silicon-aluminum and silicon-magnesium-aluminum clad brazing sheet, as many as 20% of the composites may cobble during hot rolling. However, when the cladding is provided on the core and on the brazing layer in accordance with the present invention, cobbling can be reduced to less than 3% of the ingots being rolled.

It should be noted that a layer of an aluminum alloy, e.g. 1145, 1100, 3003, 7072 or the like, may be interposed between the brazing layer and the core material, if desired.

In the continuous rolling operation, it is preferred to keep the temperature of the sheet between 500° to 800° F. In certain instances, when it is desired to cold roll the brazing sheet to gauges less than 0.125 inch, it may be desirable to anneal the sheet prior to such cold rolling. For annealing purposes, the sheet should be subjected to a temperature of about 600° to 700° F. for a period in the range of 1 to 2 hours.

The present invention is highly advantageous in that it permits the efficient production of one side clad brazing sheet as depicted in the figure. It will be appreciated that one layer brazing sheet has many applications including, for example, welded radiator tubes, tanks and the like. In addition, the present invention is advantageous in that it permits highly efficient rolling of one side braze-clad sheet.

Also, because of the control provided in the composition of the core alloy, it is substantially free from penetration by silicon. Thus, problems such as intergranular corrosion and sagging of the core are practically eliminated.

While this invention has been described in terms of preferred embodiments, the claims appended hereto are intended to encompass other embodiments which fall within the spirit of the invention.

We claim:

1. A method of producing aluminum flux brazing sheet comprising the steps of:
   (a) providing a composite assembly comprising
      (i) an ingot of aluminum alloy consisting essentially of 0 to 1.5 wt.% Mn, max. of 0.3 wt.% Si, 0 to 0.7 wt.% Mg, max. of 0.25 wt.% Cu, max. of 0.7 wt.% Fe, the remainder aluminum; and
      (ii) a layer of an aluminum brazing alloy on at least one side of the ingot, the layer consisting essentially of 5.0 to 13.0 wt.% Si, balance aluminum and incidental impurities;
   (b) providing on both sides of said composite assembly a second layer of aluminum for rolling purposes, the layer being substantially free of elemental silicon and consisting essentially of 0.2 wt.% Cu max., 0.7 wt.% Fe max., 1.5 wt.% Mn max., up to 1.0 wt.% Mg, the total of Mn plus Mg not to exceed 1.5%, up to 3.0 wt.% Zn, the remainder aluminum and incidental impurities;
   (c) hot bonding said composite assembly and the rolling layers to form a composite by rolling at a temperature in the range of 850° to 950° F. in a reversing mill; and
   (d) continuously hot rolling said composite to form brazing sheet.

2. The method according to claim 1 wherein the composite is continuously hot rolled at a temperature in the range of 500° to 800° F.

3. The method according to claim 1 wherein in step (a) Fe is maintained in the range of 0.2 to 0.45 wt.%.

4. The method according to claim 1 wherein in step (b) thereof silicon is less than 0.2 wt.%.

5. The method of producing aluminum flux brazing sheet comprising the steps of:
   (a) providing a composite assembly containing
      (i) a core material consisting essentially of 0 to 1.5 wt.% Mn, max. of 0.3 wt.% Si, 0.2 to 0.5 wt.% Fe, 0.1 to 0.2 wt.% Cu, max. of 0.7 wt.% Mg, the remainder aluminum and incidental impurities; and
      (ii) a layer of aluminum brazing alloy on at least one side of the core, the layer consisting essentially of 5.0 to 13.0 wt.% Si, the balance aluminum and incidental impurities;
   (b) providing a layer of aluminum on both sides of the composite assembly for rolling purposes, the layer consisting essentially of max. 0.2 wt.% silicon, max. 0.2 wt.% Cu, max. 0.5 wt.% Fe, max. of 1.5 wt.% Mn, Mg in the range of 0 to 0.3 wt.%, the remainder aluminum and incidental impurities;
   (c) hot bonding said composite assembly and the rolling layers by rolling at a temperature in the range of 850° to 950° F. to a thickness in the range of 0.75 to 1.5 inches; and
   (d) continuously hot rolling the composite at a temperature in the range of 500° to 800° F. to form aluminum brazing sheet.

6. A method of producing aluminum vacuum brazing sheet comprising the steps of:
   (a) providing a composite assembly comprising
      (i) an ingot of aluminum alloy consisting essentially of 0 to 1.5 wt.% Mn, max. of 0.3 wt.% Si, 0 to 0.7 wt.% Mg, max. of 0.25 wt.% Cu, max. of 0.7 wt.% Fe, the remainder aluminum; and
      (ii) a layer of an aluminum brazing alloy on one side only of the ingot, the layer consisting essentially of up to 2.5 w.t% Mg, 5.0 to 13.0 wt.% Si, the balance aluminum and incidental impurities;
   (b) providing on both sides of said composite assembly a second layer of aluminum for rolling purposes, the layer being substantially free of elemental silicon and consisting essentially of 0.2 wt.% Cu max., 0.7 wt.% Fe max., 1.5 wt.% Mn max., up to 1.0 wt.% Mg, the total of Mn plus Mg not to exceed 1.5 wt.%, up to 3.0 wt.% Zn, the remainder aluminum and incidental impurities;
   (c) hot bonding said composite assembly and the rolling layers to form a composite by rolling at a temperature in the range of 850° to 950° F. in a reversing mill; and
   (d) continuously hot rolling said composite to form brazing sheet.

7. The method of producing aluminum vacuum brazing sheet comprising the steps of:
   (a) providing a composite assembly containing
      (i) a core material consisting essentially of 0 to 1.5 wt.% Mn, max. of 0.3 wt.% Si, 0.2 to 0.5 wt.% Fe, 0.1 to 0.2 wt.% Cu, max. of 0.7 wt.% Mg, the remainder aluminum and incidental impurities; and
      (ii) a layer of aluminum brazing alloy on one side only of the core, the layer consisting essentially of up to 2.5 wt.% Mg, 5.0 to 13.0 wt.% Si, the balance aluminum and incidental impurities;
   (b) providing a layer of aluminum on both sides of the composite assembly for rolling purposes, the layer consisting essentially of max. 0.2 wt.% silicon, max. 0.2 wt.% Cu, max. 0.5 wt.% Fe, max. of 1.5 wt.% Mn, Mg in the range of 0 to 0.3 wt.%, the remainder aluminum and incidental impurities;
   (c) hot bonding said composite assembly and the rolling layers by rolling at a temperature in the range of 850° to 950° F. to a thickness in the range of 0.75 to 1.5 inches; and
   (d) continuously hot rolling the composite at a temperature in the range of 500° to 800° F. to form aluminum brazing sheet.

8. The method according to claim 7 wherein the layer of aluminum in step (b) contains up to 0.2 wt.% of at least one of the group consisting of Bi, Pb and Sn.